(12) United States Patent
Honda et al.

(10) Patent No.: US 8,929,414 B2
(45) Date of Patent: Jan. 6, 2015

(54) GAS LASER OSCILLATOR WITH DISCHARGE START JUDGMENT FUNCTION

(71) Applicant: Fanuc Corporation, Yamanashi (JP)

(72) Inventors: Masahiro Honda, Yamanashi (JP); Tooru Nukui, Yamanshi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/018,860

(22) Filed: Sep. 5, 2013

(65) Prior Publication Data

US 2014/0064317 A1    Mar. 6, 2014

(30) Foreign Application Priority Data

Sep. 6, 2012    (JP) ................................. 2012-196365

(51) Int. Cl.
*H01S 3/036* (2006.01)
*H01S 3/097* (2006.01)
*H01S 3/104* (2006.01)
*H01S 3/223* (2006.01)
*H01S 3/04* (2006.01)
*H01S 3/041* (2006.01)

(52) U.S. Cl.
CPC ............ *H01S 3/036* (2013.01); *H01S 3/09702* (2013.01); *H01S 3/104* (2013.01); *H01S 3/2232* (2013.01); *H01S 3/0407* (2013.01); *H01S 3/041* (2013.01)
USPC ...................... 372/38.07; 372/29.021; 372/55; 372/61

(58) Field of Classification Search
CPC .............................. H01S 3/09702; H01S 3/104
USPC ................................ 372/29.021, 38.07, 55, 61
See application file for complete search history.

(56) References Cited

U.S. PATENT DOCUMENTS 8,238,396 B2 *   8/2012   Ikemoto et al. ............ 372/38.07

FOREIGN PATENT DOCUMENTS

| JP | 04-056372 A | 2/1992 |
| JP | 07-039166 A | 2/1995 |
| JP | 09-064436 A | 3/1997 |
| JP | 2010-212560 A | 9/2010 |
| JP | 2010-212562 A | 9/2010 |
| JP | 2011-129670 A | 6/2011 |
| JP | 2011-222586 A | 11/2011 |

* cited by examiner

*Primary Examiner* — Yuanda Zhang
*Assistant Examiner* — Michael Carter
(74) *Attorney, Agent, or Firm* — Lowe Hauptman & Ham (57) ABSTRACT

A gas laser oscillator, including a power supply part supplying a discharge tube voltage corresponding to a power output command to a discharge tube so as to start a discharge in the discharge tube; a voltage detecting part detecting the discharge tube voltage; a current detecting part detecting an output current of the power supply part; a command voltage control part gradually increasing a power output command value output from the output command part; and a discharge start judgment part judging if the discharge in the discharge tube has started, based on a detected value of the voltage detecting part when gradually increasing the power output command value. The command voltage control part, if the output current becomes a predetermined threshold value or more when gradually increasing the power output command value, decreases the power output command value once, then again gradually increases the power output command value.

5 Claims, 8 Drawing Sheets

GAS LASER OSCILLATOR WITH DISCHARGE START JUDGMENT FUNCTION

RELATED APPLICATIONS

The present application is based on, and claims priority from, Japanese Application Number 2012-196365, filed Sep. 6, 2012, the disclosure of which is hereby incorporated by reference herein in its entirety.

BACKGROUND OF THE INVENTION

1. Field of the Invention

The present invention relates to a gas laser oscillator which has the function of judging the start of discharge.

2. Description of the Related Art

There is a gas laser oscillator known, in which a voltage which is supplied to a discharge tube is detected and it is judged if a discharge in the discharge tube has started based on the detected value. For example, in the gas laser oscillator described in Japanese Unexamined Patent Publication No. 2011-222586A (JP2011-222586A), the output command value to the laser power supply is increased in steps. Further, the difference between a ratio of change of a detected value of a discharge tube voltage relative to a power output command value and a ratio of change of a discharge tube voltage relative to a power output command value determined in advance based on data when normally discharging is determined, and judges that the discharge has started when that difference becomes within a predetermined threshold value.

In this regard, in a gas laser oscillator, changes in the pressure, flow rate, composition, and other states of the laser gas which circulates inside the discharge tube sometimes make start of discharge difficult. Therefore, if, like in the gas laser oscillator described in JP2011-222586A, increasing the power output command value in steps until the start of discharge is judged, an excessive current flows to the laser power supply, as a result, an overcurrent prevention circuit, etc. is liable to function and start of discharge is liable to be hindered.

SUMMARY OF THE INVENTION

The gas laser oscillator of one aspect of the present invention includes: a discharge tube through which laser gas circulates; an output command part outputting a power output command; a power supply part supplying a discharge tube voltage corresponding to the power output command to the discharge tube so as to start a discharge in the discharge tube; a voltage detecting part detecting the discharge tube voltage; a current detecting part detecting an output current of the power supply part; a command voltage control part gradually increasing a power output command value output from the output command part so as to start the discharge in the discharge tube; and a discharge start judgment part judging if the discharge in the discharge tube has started, based on a detected value of the voltage detecting part when gradually increasing the power output command value. Further, if the output current detected by the current detecting part becomes a predetermined threshold value or more when gradually increasing the power output command value, the command voltage control part decreases the power output command value once, then again gradually increases the power output command value.

BRIEF DESCRIPTION OF THE DRAWINGS

The object, features and advantages of the present invention will become more apparent from the following description of embodiments taken in conjunction with the accompanying drawings, in which.

DESCRIPTION OF THE EMBODIMENTS

First Embodiment

Figure 1:
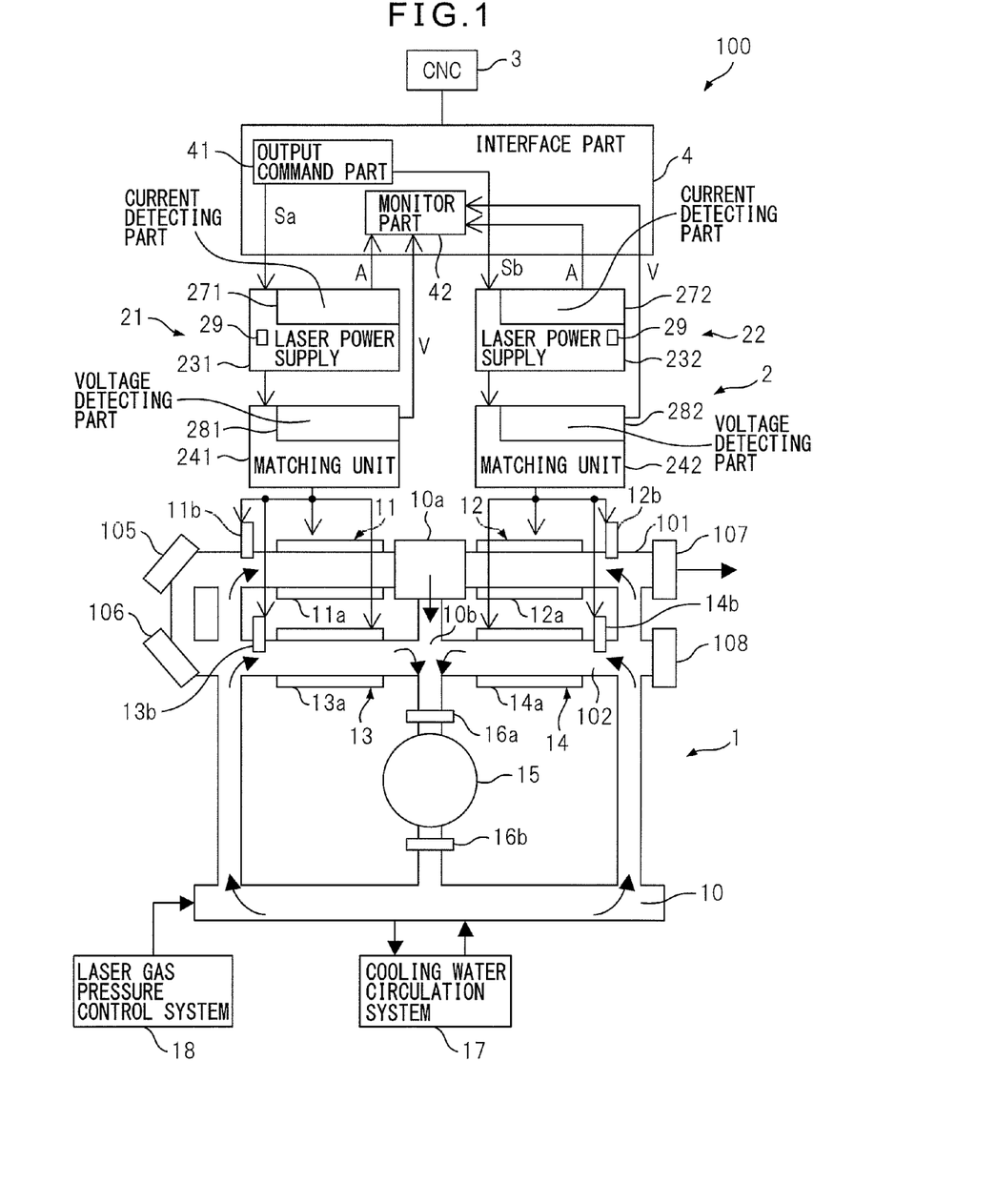
FIG. 1 is a view which shows the schematic configuration of a gas laser oscillator according to a first embodiment of the present invention.

Hereinafter, referring to FIG. 1 to FIG. 8, a first embodiment of a gas laser oscillator according to the present invention will be explained. FIG. 1 is a view which shows the schematic configuration of a gas laser oscillator 100 according to the first embodiment of the present invention. This gas laser oscillator 100 is provided with a resonator 1, a power supply part 2 which supplies power to discharge tubes 11 to 14 of the resonator 1, a numerical control device (CNC) 3 which controls the operations of the gas laser oscillator 100 as a whole, and an interface part 4 which enables the power supply 2 and the CNC 3 to communicate.

The resonator 1 has a gas channel 10 in which a laser medium, that is, laser gas, circulates. The laser gas is comprised of, for example, carbon dioxide, helium, and nitrogen mixed in a predetermined ratio of composition. The gas channel 10 has a first channel 101 which has a discharge tube holder 10a and a second channel 102 which is formed in parallel with the first channel 101 and has a discharge tube holder 10b provided at it. The first channel 101 is provided with a pair of discharge tubes 11 and 12 which straddle the discharge tube holder 10a, while the second channel 102 is provided with a pair of discharge tubes 13 and 14 which straddle the discharge tube holder 10b.

At the end portions of the channels 101 and 102 at the discharge tube 11 and 13 side, bend mirrors 105 and 106 are provided, while at the end portion at the discharge tube 12 side, an output mirror 107 is provided and at the end portion of the discharge tube 14 side, a rear mirror 108 is provided. The discharge tubes 11 to 14 have pairs of main electrodes 11a to 14a which are arranged facing each other straddling the channels 101 and 102. At the outsides in the channel direction of the main electrodes 11a to 14a (upstream sides in direction of flow of laser gas), auxiliary electrodes 11b to 14b are provided. Power from the power supply 2 is supplied to the main electrodes 11a to 14a and auxiliary electrodes 11b to 14b.

If the main electrodes 11a to 14a are supplied with power, discharge is started in the laser gas inside of the discharge tubes 11 to 14. Due to this main discharge, the laser gas is excited and light is generated, resonance occurs between the output mirror 107 and the rear mirror 108, the light is amplified by stimulated emission, and part is taken out from the output mirror 107. The taken out laser light is used for laser machining, etc.

In the laser operating state where the laser oscillator 100 can output a laser beam, even if the laser output is zero (0 W), a certain amount of power continues to be supplied from the power supply part 2 to the main electrodes 11a to 14a and auxiliary electrodes 11b to 14b. The amount of the supplied power is adjusted to a state where the discharge of the discharge tubes by the main electrodes has been extinguished and only auxiliary discharge from the auxiliary electrodes has been started. This auxiliary discharge is a weak discharge, so does not directly contribute to the laser output. However, the auxiliary discharge is maintained as auxiliary discharge for facilitating the start of main discharge even in a state where the laser output is zero (0 W) (state of base discharge). That is, even when the laser output is zero, so long as the gas laser oscillator 100 is not completely stopped, the power supply part 2 outputs a standby power at which auxiliary discharge is maintained.

The gas channel 10 is connected to a turbo blower 15. By rotation of the turbo blower 15, as shown by the illustrated arrows, laser gas is sucked in from the first end sides of the discharge tubes 11 to 14 and discharged from the turbo blower 15. The laser gas discharged from the turbo blower 15 is supplied to the other end sides of the discharge tubes 11 to 14 and circulated through the gas channel 10.

Figure 4:
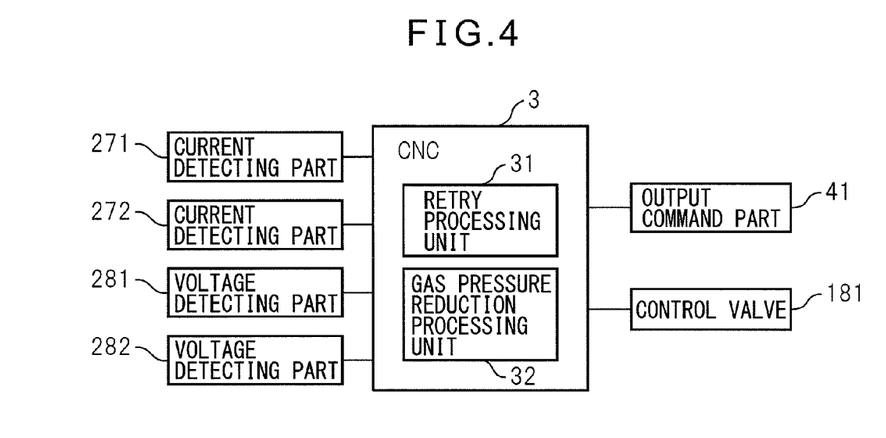
FIG. 4 is a block diagram which shows the main configuration of a CNC in a gas laser oscillator according to a first embodiment of the present invention.

At the upstream side and downstream side of the turbo blower 15, heat exchangers 16a and 16b are provided. The laser gas which circulates through the gas channel 10 is cooled by the heat exchangers 16a and 16b. Cooling water as a cooling medium is supplied to the heat exchangers 16a and 16b by the cooling water circulation system 17. The pressure of the laser gas inside of the gas channel 10 is controlled by a laser gas pressure control system 18 which supplies and discharges the laser gas. That is, the laser gas pressure control system 18 has a control valve 181 which supplies and discharges laser gas (FIG. 4). By opening and closing of the control valve 181, the laser gas pressure is controlled.

The power supply part 2 has a first power supply part 21 which supplies voltage to the discharge tubes 11 and 13 (main electrodes 11a and 13a and auxiliary electrodes 11b and 13b) and a second power supply part 22 which supplies voltage to the discharge tubes 12 and 14 (main electrodes 12a and 14a and auxiliary electrodes 12b and 14b). The first power supply part 21 has a laser power supply 231 and a matching unit 241, while the second power supply part 22 has a laser power supply 232 and a matching unit 242. The laser power supplies 231 and 232 are configured equivalently to each other, while the matching units 241 and 242 are also configured equivalently. The laser power supplies 231 and 232 are sometimes also represented by reference numeral 23, while the matching units 241 and 242 are sometimes also represented by reference numeral 24.

Figure 2:
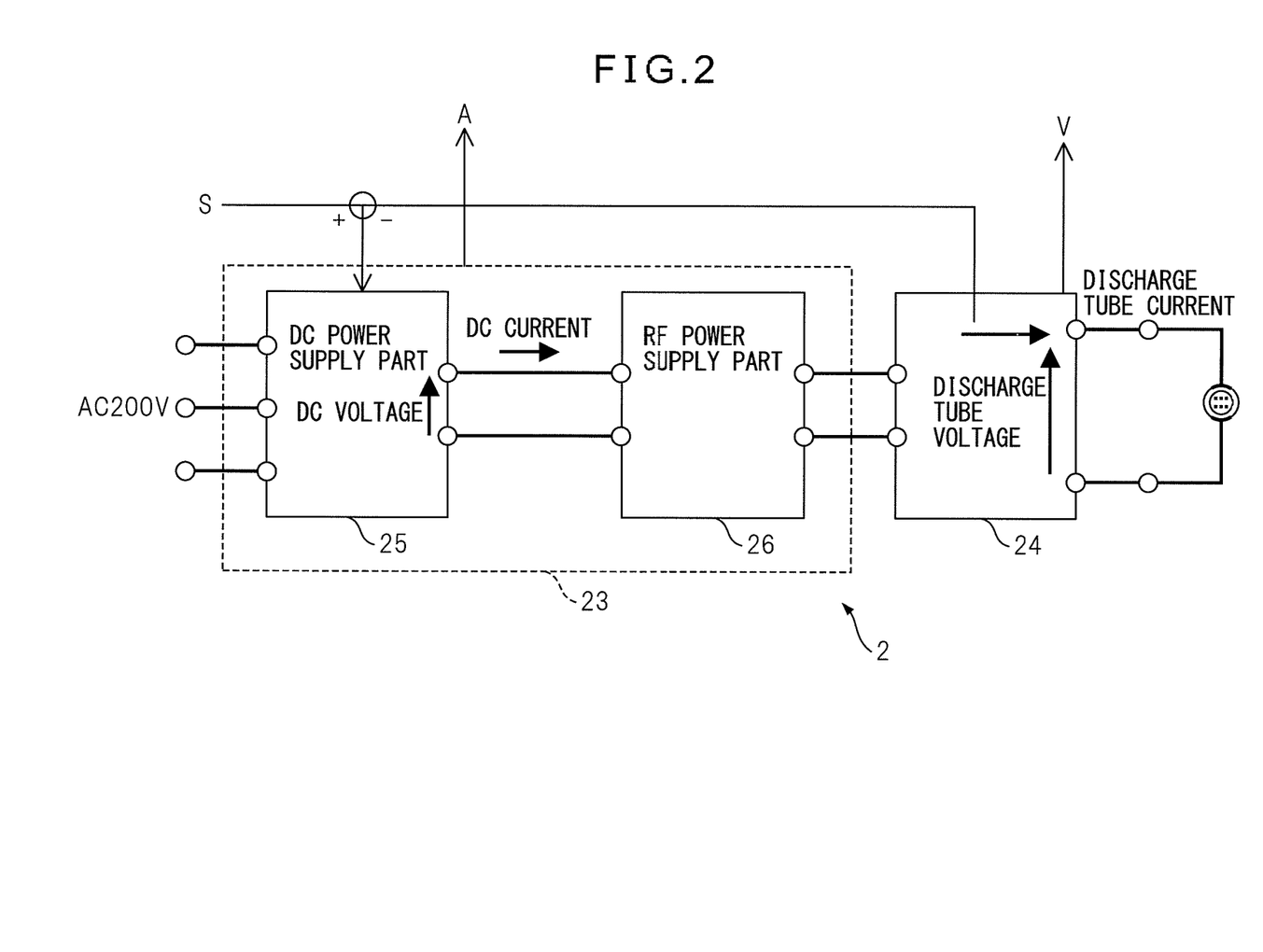
FIG. 2 is a block diagram which shows the configurations of a laser power supply and a matching unit of FIG. 1.

FIG. 2 is a block diagram which shows the configurations of a laser power supply 23 and a matching unit 24. As shown in FIG. 2, the laser power supply 23 has a DC (direct current) power supply part 25 and an RF (radio frequency) power supply part 26. The DC power supply 25 is connected to a three-phase alternating current 200V and outputs a DC current "A" to the RF power supply part 26 based on a power output command value S from the interface part 4. The RF power supply part 26 converts the output from the DC power supply part 25 to a high frequency power, and then outputs it to the matching unit 24. The matching unit 24 matches the output impedance of the RF power supply part side and the input impedance of the discharge tube side, and supplies a voltage corresponding to the power output command value S (discharge tube voltage V) to the discharge tubes 11 to 14. Due to this, current (discharge tube current) flows to the discharge tubes 11 to 14. A signal corresponding to the discharge tube current is fed back to the power output command whereby the discharge tube current is controlled to a predetermined value.

In FIG. 2, the DC current "A" supplied from the DC power supply part 25 to the RF power supply part 26 and the discharge tube voltage V supplied through the matching unit 24 to the discharge tubes 11 to 14 change greatly in characteristics depending on the effects of the discharge load of the laser gas, etc. In the present embodiment, these DC current "A" and discharge tube voltage V are detected by detecting parts. That is, as shown in FIG. 1, the laser power supplies 231 and 232 respectively have current detecting parts 271 and 272 which detect the DC current "A", while the matching units 241 and 242 have voltage detecting parts 281 and 282 which detect the discharge tube voltage V.

The laser power supplies 231 and 232 further respectively have self protection circuits 29. The self protection circuits 29 are overcurrent prevention circuits. If the DC current "A" detected by the current detecting parts 271 and 272 reaches a threshold value A1 which is set by the circuits, the overcurrent prevention circuits operate. Regardless of the power output command value, the output of the DC current "A" supplied from the DC power supply part 25 to the RF power supply part 26 is made to stop and the discharge tube voltage V is made to fall to 0. Due to this, the operation of the gas laser oscillator 100 forcibly stops, the DC current "A" is cut, and the laser power supplies are prevented from being damaged by overcurrent. Such an operation for stopping the gas laser oscillator 100 will be called an "alarm stop".

Figure 3:
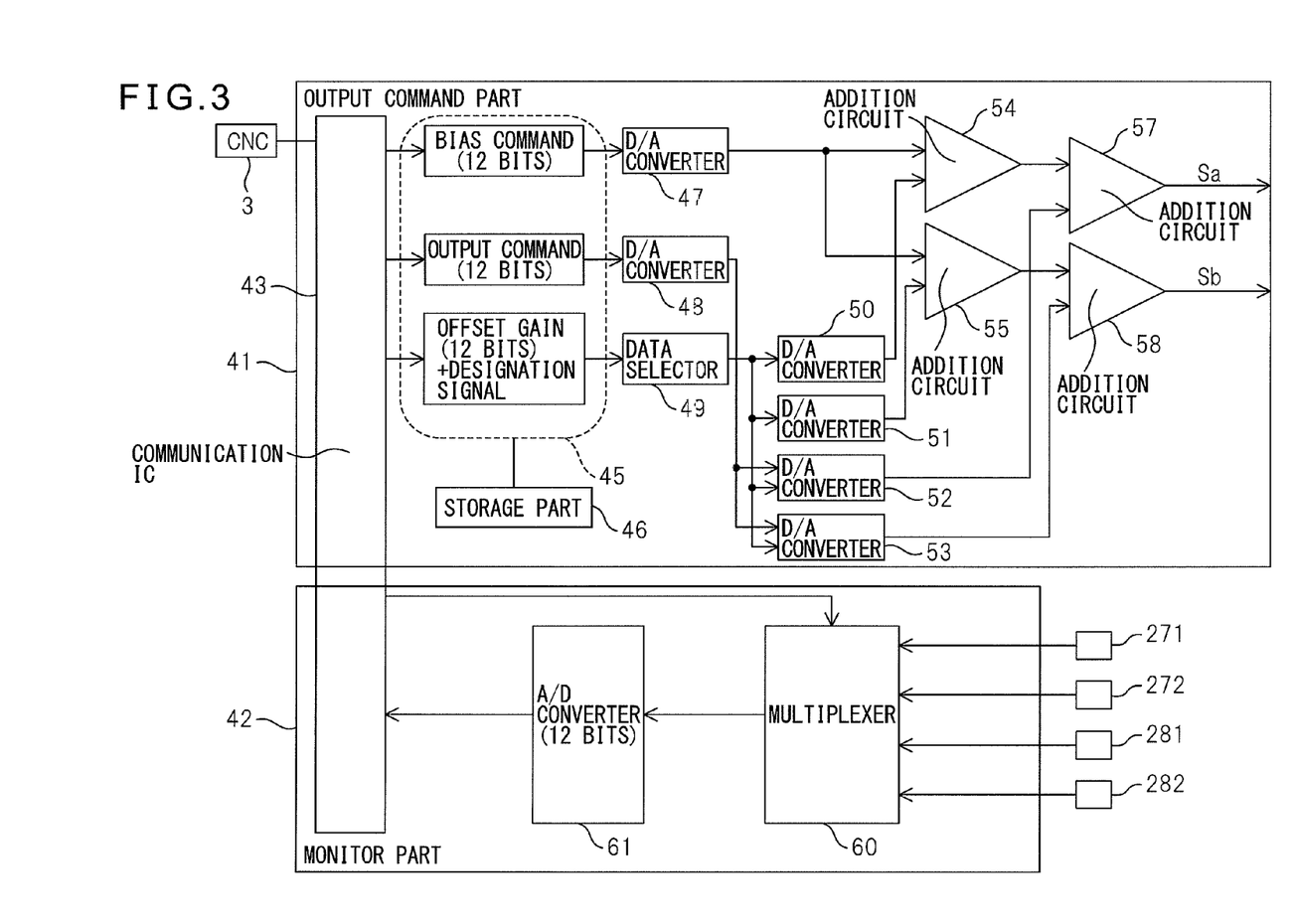
FIG. 3 is a block diagram which shows the configurations of an output command part and a monitor part of FIG. 1.

The interface part 4 has an output command part 41 which outputs power output command values Sa and Sb respectively to the laser power supplies 231 and 232 and a monitor part 42 which fetches signals from current detecting parts 271 and 272 and voltage detecting parts 281 and 282. The power output command values Sa and Sb are sometimes simply expressed overall as "S". FIG. 3 is a block diagram which shows the configurations of the output command part 41 and the monitor part 42. The output command part 41 and monitor part 42 have a communication IC (communication-use integrated circuit) 43 which communicates with each other and communicate various types of data with the CNC 3 through the communication IC 43.

As shown in FIG. 3, the output command part 41 has a demultiplexer 45 which demultiplexes a command from the CNC 3 into a 12-bit bias command Cb, output command Co, offset command Cs, and gain command Cg. The bias command Cb is a predetermined command value which is constantly commanded from the CNC 3 in the laser operating state where a laser beam can be output. The output command Co is a command which controls the laser output and is determined by what watt of laser beam the laser oscillator 100 is to output. The offset command Cs is set corresponding to the loads of the laser power supplies 231 and 232 for the bias command Cb, while the gain command Cg is set corresponding to the loads of the laser power supplies 231 and 232 for the output command Co.

The "loads of the laser power supplies 231 and 232" are loads linked with the laser power supplies 231 and 232. The loads of the laser power supply 231 include the matching unit 241 of the first power supply part 21, the discharge tubes 11 and 13, the gas pressures inside of the discharge tubes 11 and 13, the auxiliary electrodes 11b and 13b, etc. The loads of the laser power supply 232 include the matching unit 243 of the second power supply part 22, the discharge tubes 12 and 14, the gas pressures inside of the discharge tubes 12 and 14, the auxiliary electrodes 12b and 14b, etc. The bias command Cb and the output command Co are made common commands for the laser power supplies 231 and 232, while the offset command Cs and gain command Cg are set individually corresponding to the loads of the laser power supplies 231 and 232 so as to enable the variation in loads between the laser power supplies 231 and 232 to be absorbed. The set values of the offset command Cs1 and the gain command Cg1 corresponding to the laser power supply 231 and the set values of the offset command Cs2 and the gain command Cg2 corresponding to the laser power supply 232 are stored in advance in the storage part 46.

The bias command Cb is converted from a digital to analog format through a D/A converter 47 and input to addition circuits 54 and 55. The output command Co is converted from a digital to analog format through a D/A converter 48 and input to D/A converters 52 and 53. The offset commands Cs1 and Cs2 and the gain commands Cg1 and Cg2 are successively switched based on command signals from the CNC 3, whereby the offset commands Cs1 and Cs2 are input through the data selector 49 to the D/A converters 50 and 51 and the gain commands Cg1 and Cg2 are input to the D/A converters 52 and 53. In the D/A converters 50 and 51, the offset commands Cs1 and Cs2 are converted from a digital to analog format and input to the addition circuits 54 and 55. In the D/A converters 52 and 53, the output command Co is multiplied with the gain commands Cg1 and Cg2, the products are converted from a digital to analog format and input to addition circuits 57 and 58.

In the addition circuits 54 and 55, the D/A converted offset commands Cs1 and Cs2 are added to the D/A converted bias command Cb. At the addition circuits 57 and 58, the D/A converted commands obtained by multiplication of the output command Co and the gain commands Cg are added to the commands obtained by addition at the addition circuits 54 and 55. Due to this, the power output command values Sa and Sb to the laser power supply 231 and 232 are generated.

The monitor part 42 has a multiplexer 60 which switches and successively outputs signals from the current detecting parts 271 and 272 and voltage detecting parts 281 and 282 by a select signal from the CNC 3. The signal output from the multiplexer 60 is converted from an analog to digital format at the 12 bit A/D converter 61 and is output through the communication IC 43 to the CNC 3.

In this regard, the gas laser oscillator 100 supplies the discharge tubes 11 to 14 with several kilovolts of voltage so as to excite the laser gas and generate a discharge state. However, sometimes changes in the pressure, flow rate, composition, etc. of the laser gas make discharge difficult to start. If outputting a laser beam in a state where discharge has not been started, the impedance cannot be matched between the laser power supply 23 and the discharge load, an excessive voltage is supplied to the discharge tubes 11 to 14, and an excessive current is liable to flow to the laser power supplies 23 causing them to break or causing an alarm stop. Therefore, in the present embodiment, the CNC 3 is configured as explained below and overcurrent to the laser power supply 23 is prevented while promoting the start of discharge.

FIG. 4 is a block diagram which shows the main configuration of the CNC 3 in the gas laser oscillator 100 according to the first embodiment and in particular shows the characterizing configuration when making the discharge tubes 11 to 14 start discharge. That is, although discharge is started as a prior step for shifting to a laser operating state able to output a laser beam, the CNC 3 has a retry processing unit 31 which carries out processing at the time of start of discharge and a gas pressure reduction processing unit 32.

The CNC 3 is configured including a processing system which has a CPU, ROM, RAM, and other peripheral circuits. The CNC 3 receives as input the signals from the current detecting parts 271 and 272 and voltage detecting parts 281 and 282. The CNC 3 uses these input signals as the basis to carry out a predetermined processing at the start of discharge, outputs control signals to the output command part 41, and outputs control signals to the control valve 181 which forms part of the laser gas pressure control system 18.

Figure 5:
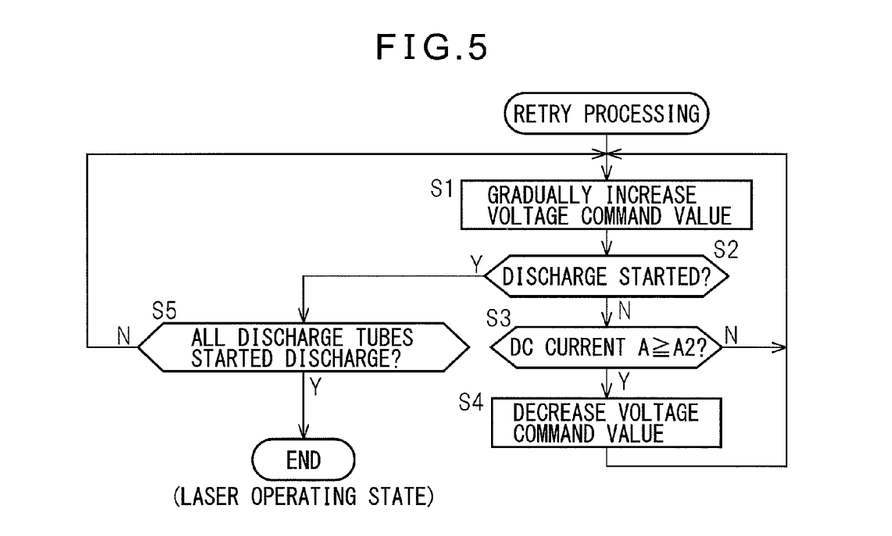
FIG. 5 is a flow chart which shows an example of processing which is carried out by a retry processing unit of FIG. 4.
Figure 6:
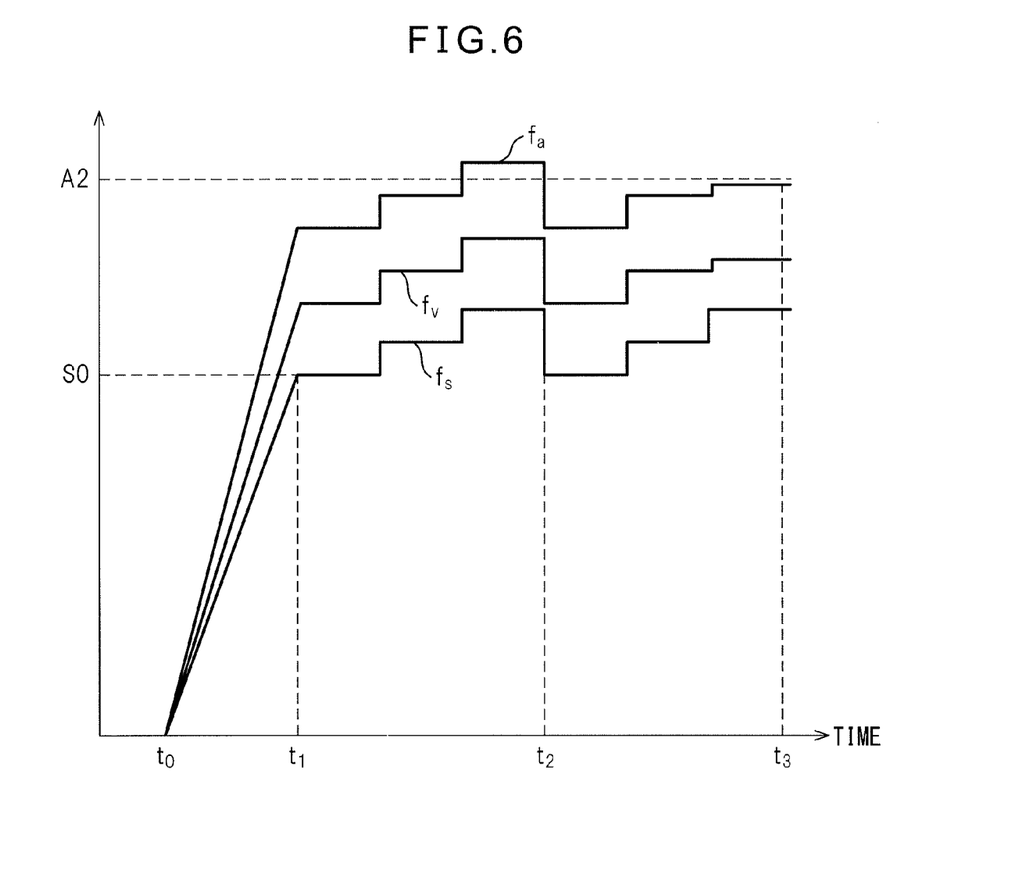
FIG. 6 is a view which shows an example of the operating characteristics due to the retry processing of FIG. 5.

FIG. 5 is a flow chart which shows an example of the processing carried out by the retry processing unit 31 (retry processing), while FIG. 6 is a characteristic diagram which shows an example of the operation by the retry processing. The processing shown in the flow chart of FIG. 5 is started when a command to start discharge is input to the CNC 3. Below, referring to FIG. 6, the retry processing of FIG. 5 will be explained. In FIG. 6, the characteristic feature fs is the power output command value S (Sa, Sb) from the output command part 41, the characteristic feature fv is the discharge tube voltage V which is detected by the voltage detecting parts 281 and 282, and the characteristic feature fa is the DC current A which is detected by the current detecting parts 271 and 272.

At step S1, first, a control signal is output to the output command part 41 and the power output command value S (bias command Cb) is made to increase over a predetermined time (time t0 to time t1) up to a predetermined value S0. Furthermore, after the power output command value S is made to increase to the predetermined value S0 (time t0 to time t1), for example, as shown in FIG. 6, the power output command value S is made to gradually increase by increments of predetermined amounts at a predetermined period. That is, the power output command value S is increased in steps. Along with the rise in the power output command value S, the discharge tube voltage V and DC current A also increase in steps.

Figure 7:
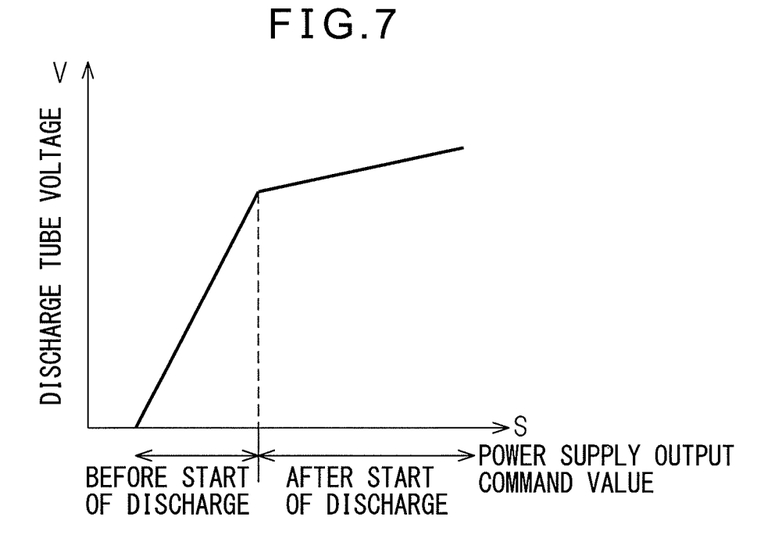
FIG. 7 is a view which shows the relationship of a power output command value and a discharge tube voltage.

At step S2, signals from the voltage detecting parts 281 and 282 are read and the amount of change of the discharge tube voltage V is used as the basis to judge if discharge has started. FIG. 7 is a view which shows the relationship of the power output command value S and the discharge tube voltage V. At step S1, when increasing the power output command value S by predetermined increments in steps, as shown in FIG. 7, the ratio of change dV/ds of the discharge tube voltage V before the start of discharge relative to the power output command value S (slope of characteristic) is larger than the ratio of change dV/ds of the discharge tube voltage V after the start of discharge relative to the power output command value S. Considering this point, the ratio of change dVa/ds of the discharge tube voltage V relative to the power output command value S at the time of normal operation (for example, at the time of factory shipment or at the time of actual normal operation) (ratio of change after start of discharge) is stored in advance in the memory (storage part) of the CNC 3 as a reference value. Further, at step S2, the ratio of change dV/ds of the discharge tube voltage V and the reference value dVa/ds are compared and, when the difference α of the two is within a predetermined threshold value α1, it is judged that discharge has started (time t3 of FIG. 6).

If the judgment at step S2 is NO, the routine proceeds to step S3, while if the judgment is YES, the routine proceeds to step S5. At step S5, it is judged whether the start of discharge has been judged for exactly the number of the discharge tubes 11 to 14 (4 times), that is, if all of the discharge tubes 11 to 14 have started discharge. If the judgment at step S5 is NO, the routine returns to step S1, while if it is YES, the processing of FIG. 5 is ended and the laser operating state is shifted to one able to output a laser beam. At this time, the output command value Co becomes 0 (laser output 0 W), the bias command Cb becomes a predetermined value in the state of base discharge, and the power output command value S becomes a value of the bias command Cb plus the offset commands (Cs1 and Cs2) of the different power supplies.

At step S3, the signals from the current detecting parts 271 and 272 are read and it is judged if the detected DC current "A" is a predetermined threshold value A2 or more. This processing is processing for preventing the DC current "A" from becoming excessive and an alarm stop from being triggered. The predetermined value A2 is set to a value smaller than a threshold value A1 at the time of an alarm stop which was set in an overcurrent prevention circuit in a laser power supply. A1 and A2 may be set to the same threshold value. In this case, it is sufficient that the speed of detection of current at the CNC 3 be faster than the speed of detection of current at the overcurrent prevention circuit. If the judgment at step S3 is YES, the routine proceeds to step S4, while if it is NO, the routine returns to step S1.

At step S4, the bias output command value Cb is decreased by a predetermined value so as to decrease the power output command value S. For example, the power output command value S is decreased by a predetermined amount which is larger than the increment in the steps at the time of increasing it in steps. Alternatively, as shown in FIG. 6, the power output command value S is decreased to the initial value S0 (time t2). Next, the routine returns to step S1 where similar processing is repeated. Due to this, the power output command value S again gradually increases and the start of discharge is again judged. In this way, decreasing the discharge tube voltage V once, then again increasing it (operation after time t2) is called a "retry operation".

The retry operation is carried out in the time t1 to time t2 after the discharge tubes 11 to 14 are supplied with voltage. By carrying out the retry operation, the time when the discharge tubes 11 to 14 are supplied with voltage becomes longer, so discharge is started more easily than in the previous processing when increasing the power output command value S. Therefore, as shown in FIG. 6, after the time t2, in the same way as the previous time (time t1 to time t2), even if increasing the discharge tube voltage V, discharge is started (time t3). Due to this, for example, when stopping the gas laser oscillator 100 for several weeks, then starting it up, etc., even if a change in the composition of the laser gas causes discharge to become hard to start, discharge can be easily made to start. The above retry operation is carried out for a predetermined number of times until discharge is started.

Figure 8:
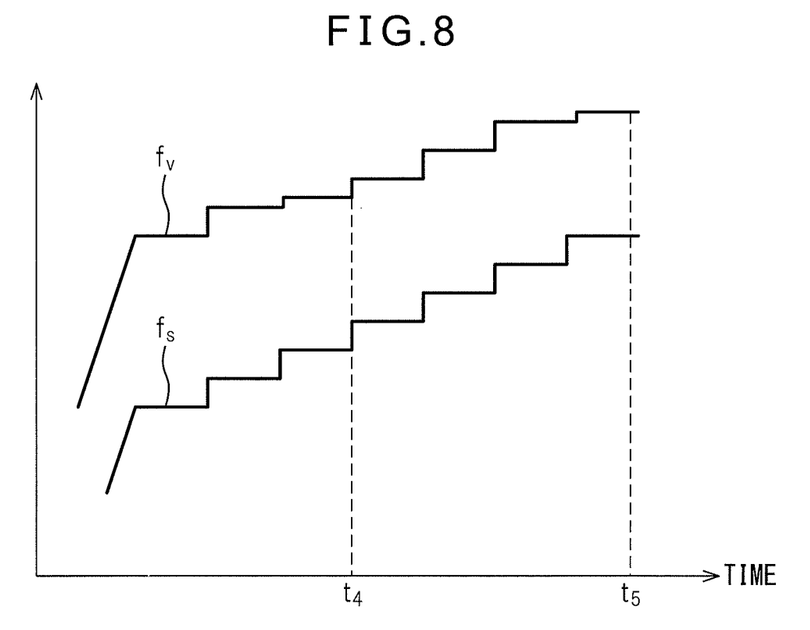
FIG. 8 is a view which shows an example of the operating characteristics until discharge in a plurality of discharge tubes start.

FIG. 8 is a view which shows an example of the operating characteristics up to when a plurality of discharge tubes (for example, the discharge tubes 11 and 13 which are connected to the same laser power supply 231) start to discharge. In the figure, the characteristic feature fs is the power output command value Sa from the output command part 41, while the characteristic feature fv is the discharge tube voltage V detected at the voltage detector 281. At the time t4 of FIG. 8, the difference α between the ratio of change dV/ds of the discharge tube voltage V of one of the discharge tubes (for example, the discharge tube 11) and the reference value dVa/ds becomes within the threshold value α1 and it is judged that discharge in the discharge tube 11 has started. However, the other discharge tube (for example, the discharge tube 13) is still not judged that discharge has started. Therefore, the judgment at step S5 is NO and the power output command value Sa gradually increases. At this time, the ratio of change dV/ds of the discharge tube voltage V becomes smaller once at the time t4, then returns to the original large state so as to start discharge of the second discharge tube 13. After this, when, at the time t5, discharge in the second discharge tube 13 has started, the ratio of change dV/ds of the discharge tube voltage V again becomes smaller.

If carrying out the retry operation a predetermined number of times, normally discharge in all of the discharge tubes 11 to 14 will have started. However, if the temperature of the cooling water which is supplied by the cooling water circulation system 17 is extremely low or if the laser gas is contaminated by the atmosphere, sometimes discharge will not be started even if carrying out the retry operation a predetermined number of times. In this case, the gas pressure reduction processing unit 32 of FIG. 4 is carried out processing to lower the gas pressure.

The gas pressure reduction processing unit 32 first outputs a control signal to the control valve 181 of the laser gas pressure control system 18 to open the control valve 181 and discharge the laser gas from the gas channel 10. Due to this, the gas pressure inside of the discharge tubes 11 to 14 is decreased to a predetermined gas pressure which is lower than the operating gas pressure which is required for obtaining the desired laser output. Next, the power output command value S is lowered to 0, then the power output command value S is gradually increased over a predetermined time and voltage is supplied to the discharge tubes 11 to 14. The laser gas pressure in this case is set to a pressure enabling assured start of discharge even if the temperature of the cooling water is extremely low or the laser gas is contaminated by the atmosphere. If it is judged that discharge in the discharge tubes 11 to 14 have started, the control valve 181 is opened to supply laser gas to the gas channel 10, and return the laser gas pressure to the original operating gas pressure. The above completes the operation of lowering the gas pressure.

According to the first embodiment, the following functions and effects can be exhibited.

(1) The gas laser oscillator 100 includes discharge tubes 11 to 14 through which laser gas circulates, a output command part 41 which outputs a power output command, a power supply part 2 which supplies a discharge tube voltage V corresponding to the power output command to the discharge tubes 11 to 14 so as to start a discharge in the discharge tubes 11 to 14, voltage detecting parts 281 and 282 which detect the discharge tube voltage V, current detecting parts 271 and 272 which detect the DC current of the power supply part 2, a CNC 3 (retry processing unit 31) which gradually increases a power output command value S which is output from the output command part 41 so as to start the discharge in the discharge tubes 11 to 14, and a retry processing unit 31 which judges if the discharge in the discharge tubes 11 to 14 have started, based on a detected values of the voltage detecting part 281 and 282 when gradually increasing the power output command value S. Further, if the DC current "A" detected before it is judged that the discharge has started becomes a predetermined value A2 or more, the retry processing unit 31 decreases the power output command value S once, then again gradually increases the power output command value S (step S4 to step S1). Due to this, even if a change in the composition of the laser gas, etc. makes discharge hard to start, it is possible to easily make discharge in the discharge tubes 11 to 14 start without excessive current flowing to the laser power supply 23.

(2) The threshold value A2 of the DC current for carrying out the retry operation is set to a value smaller than the threshold value A1 of the DC current at the time of an alarm stop. Due to this, at the time of start of discharge, the self protection circuits 29 can function and prevent the gas laser oscillator 100 from stopping by an alarm stop. For example, if the gas laser oscillator 100 stops by an alarm stop at the time of night time unmanned operation, etc., a drop in the operating rate will be invited and time will be required for restoring the system (investigating the cause and restarting). However, by avoiding an alarm stop, it is possible to prevent a drop in the operating rate.

(3) When discharge is not started even if carrying out the retry operation a plurality of times by processing at the retry processing unit 31, a gas pressure reduction operation is carried out by processing at the gas pressure reduction processing unit 32. Due to this, it is possible to completely avoid an alarm stop no matter what the conditions and reliably make discharge in the discharge tubes 11 to 14 start. In this case, if carrying out a gas pressure reduction operation, the amount of consumption of the laser gas increases and time is required for returning the laser gas pressure to the operating gas pressure. However, in the present embodiment, the retry operation is carried out preferentially over the gas pressure reduction operation, so the frequency of the gas pressure reduction operation can be kept to the minimum.

(4) When the gas laser oscillator 100 has a plurality of discharge tubes 11 to 14, processing at the retry processing unit 31 is used so as to make the power output command value S gradually increase until it is judged that discharge in all of the discharge tubes 11 to 14 have started (step S5 to step S1). When a plurality of discharge tubes 11 to 14 are connected to the laser power supplies 231 and 232, variations in the dimensions of the discharge tubes 11 to 14, variations in the flow rates of laser gas which flows to the discharge tubes 11 to 14, etc. cause the discharge tube voltage at which discharge is started to differ for each discharge tube. However, by repeatedly making the power output command value S gradually increase until judging start of discharge in all of the discharge tubes 11 to 14, it is possible to make discharge in all of the discharge tubes 11 to 14 start. Therefore, for example, when discharge in one discharge tube 11 starts and discharge in the other discharge tubes 12 to 14 do not start, it is possible to prevent the CNC 3 from mistakenly judging that the laser operating state is one in which beam output is possible, excessive current flowing to the laser power supplies 23, and excessive voltage being supplied to the discharge tubes.

Second Embodiment

Figure 9:
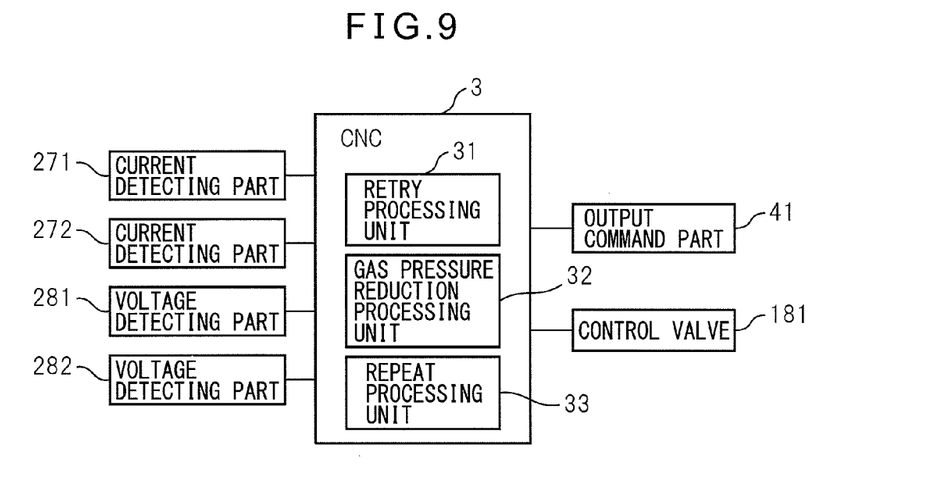
FIG. 9 is a block diagram which shows the main configuration of a CNC in a gas laser oscillator according to a second embodiment of the present invention.
Figure 10:
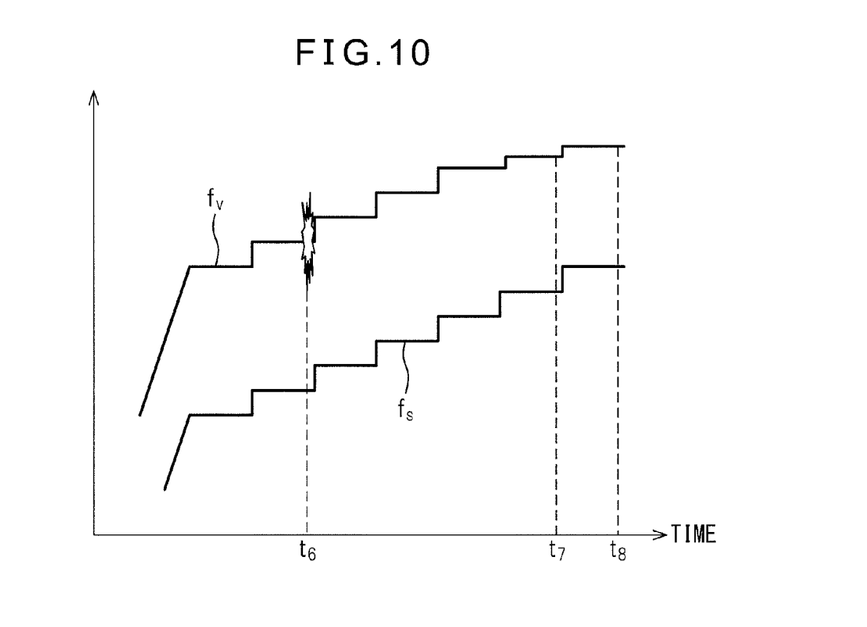
FIG. 10 is a view which shows an example of the operating characteristics for explaining processing which is carried out by the repeat processing unit of FIG. 9.

Referring to FIG. 9 and FIG. 10, a second embodiment of the present invention will be explained. The second embodiment differs from the first embodiment in the processing which is carried out by the CNC 3 at the time of start of discharge. Below, the points of difference from the first embodiment will mainly be explained. FIG. 9 is a block diagram which shows the main configuration of the CNC 3 in the gas laser oscillator 100 according to the second embodiment. Note that, configurations the same as in FIG. 5 are assigned the same reference notations.

As shown in FIG. 9, the CNC 3 has not only the retry processing unit 31 and the gas pressure reduction processing unit 32, but also a repeat processing unit 33. In the repeat processing unit 33, part of the processing at the retry processing unit 31, that is, the processing relating to the judgment of the start of discharge (step S2 of FIG. 5), is changed. Specifically, in the same way as step S2 of FIG. 5, the ratio of change dV/ds of the discharge tube voltage V and the ratio of change dV/ds of the discharge tube voltage V at the time of normal operation stored in advance (reference value dVa/ds) are compared and, when the difference $\alpha$ of the two becomes within a predetermined threshold value $\alpha1$, it is judged that a discharge start condition has been established. Further, if it is judged that the discharge start condition has been established a predetermined plurality of times (predetermined number of times N), it is judged that discharge has started.

FIG. 10 is a view which shows an example of the operating characteristics for explaining the processing at the repeat processing unit 33 (repeat processing). In the figure, the characteristic feature fs shows the power output command value S, while the characteristic feature fv shows the discharge tube voltage V. As shown in FIG. 10, at the time t6, if noise, etc. causes the discharge tube voltage V to become abnormal, the ratio of change dV/ds of the discharge tube voltage V becomes smaller and the discharge start condition is liable to be established and start of discharge is liable to be mistakenly judged. However, in this case, before the discharge start condition becomes established for a predetermined number of times N, the ratio of change dV/ds of the discharge tube voltage V immediately becomes larger, so the CNC 3 does not judge this as a start of discharge and mistaken judgment of start of discharge due to noise or another abnormality can be prevented. After this, at the time t7, if discharge is truly started, the ratio of change dV/ds of the discharge tube voltage V stably (straight since t7) becomes smaller and the discharge start condition is established a predetermined number of times N. At the time t8, if it is judged that the discharge start condition has been established a predetermined number of times N, it is judged that discharge has been started and the operation shifts to a laser operating state enabling laser output.

In this way, in the second embodiment, when the difference $\alpha$ between the ratio of change dV/ds of the discharge tube voltage V detected at the voltage detecting parts 281 and 282 and the ratio of change dV/ds of the discharge tube voltage V at the time of normal operation stored in advance becomes within a predetermined value $\alpha1$, it is judged that the discharge start condition has been established. When the discharge start condition has been established a predetermined number of times N, it is judged that discharge has started. Due to this, when the ratio of change of the discharge tube voltage V becomes temporarily smaller due to the effect of noise, etc., it is possible to prevent mistaken judgment by the CNC 3 of the start of discharge and possible to accurately judge the start of discharge.

Modifications

In the gas laser oscillator 100 of the present embodiment, the base discharge is adjusted in advance. "Adjustment of the base discharge" is adjustment of the offset command Cs (FIG.

3) so that in the state where the laser output becomes 0 W and a predetermined bias command Cb is output in the laser operating state, the discharge of all of the discharge tubes 11 to 14 is extinguished and only the auxiliary electrodes 11b to 14b are discharging. This offset command Cs can be stored in the storage part 46 and, when starting discharge, the offset command Cs can be output and added to the bias command Cb in advance. Due to this, regardless of the variation in the loads of the laser power supplies 231 and 232, it is possible to make discharge in the plurality of discharge tubes 11 to 14 start at the same timing. This point will be explained with reference to FIG. 11 and FIG. 12. Below, in order to simplify the explanation, assume that the discharge tubes 12 and 14 of the laser power supply 232 side are harder than the discharge tubes 11 and 13 of the laser power supply 231 side to start in discharge and that at the time of start of discharge, an offset command Cs2 is output to the laser power supply 232 side.

Figure 11:
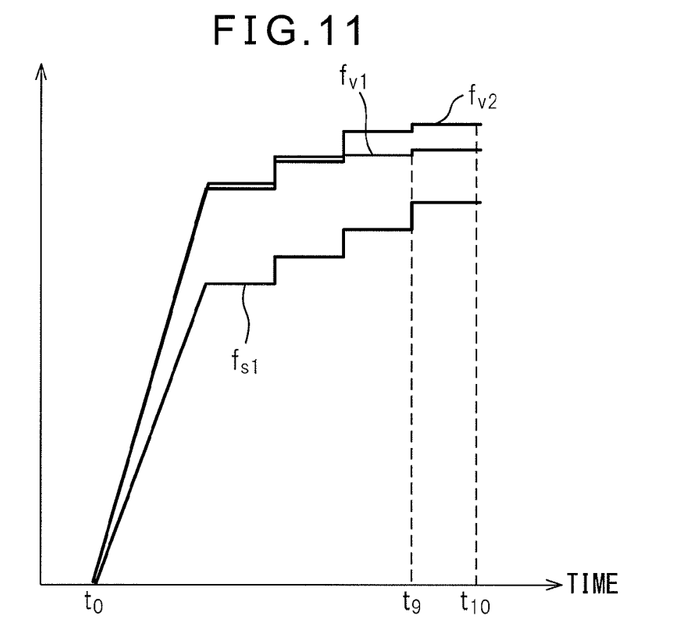
FIG. 11 is a view which shows an example of the operating characteristics before an offset command is output from the output command part.
Figure 12:
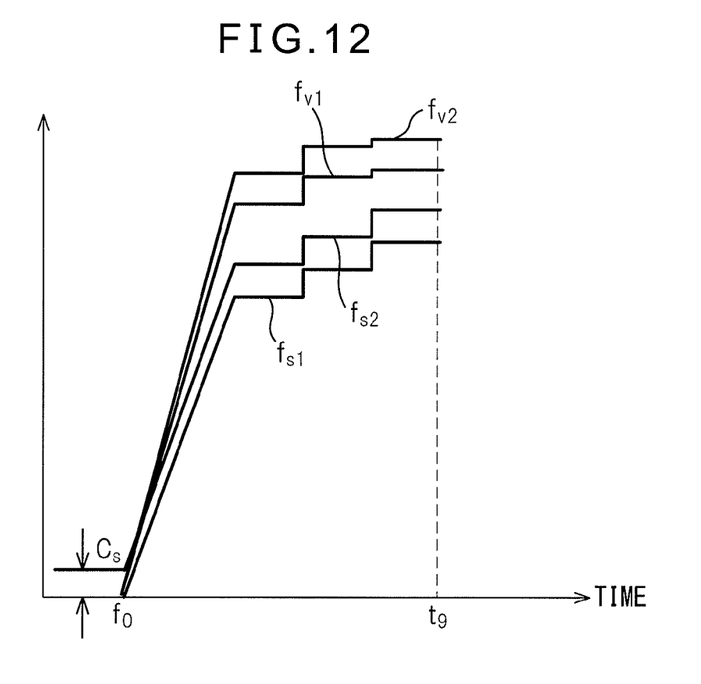
FIG. 12 is a view which shows an example of the operating characteristics after an offset command is output from the output command part.

FIG. 11 is a view which shows an example of the operating characteristics before outputting the offset command Cs2, while FIG. 12 is a view which shows an example of the operating characteristics after outputting the offset command Cs2. In the figure, the characteristic feature fs1 is the power output command value Sa comprised of the bias command Cb, the characteristic feature fs2 is the power output command value Sb comprised of the bias command Cb plus the offset command Cs2, the characteristic feature fv1 is the discharge tube voltage V which is applied to the discharge tube which is connected to the laser power supply 231 (for example, the discharge tube 11), and the characteristic feature fv2 is the discharge tube voltage V which is applied to the discharge tube (for example, discharge tube 12) which is connected to the laser power supply 232.

As shown in FIG. 11, the discharge tube 11 at the laser power supply 231 side starts discharge at the time t9. As opposed to this, the discharge tube 12 at the laser power supply 232 has difficulty starting discharge, so discharge starts at the time t10 delayed from the time t9. When, in this way, outputting only the same bias command Cb to the laser power supplies 231 and 232, variation occurs in the timings of the start of discharge. On the other hand, when adding the offset command Cs2 to the bias command Cb of the laser power supply 232 side where discharge is difficult to start and outputting the result, as shown in FIG. 12, the timing of the start of discharge of the discharge tube 12 becomes earlier and discharge in the discharge tube 12 can be made to start at the time t9 or the same timing as the discharge tube 11.

In the above embodiments, a plurality of power supplies 21 and 22 and a plurality of discharge tubes 11 to 14 are provided and the power output command value S is gradually increased until it is judged that discharge had started for the number of the discharge tubes 11 to 14. However, the numbers of power supply parts and discharge tubes are not limited to the ones explained above. For example, there may also be a single power supply part and both a single power supply part and discharge tube. A command from the CNC 3 as a command voltage control part is used to increase the power output command value S output from the output command part 41 in steps. However, so long as gradually increasing the power output command value S so as to start discharge in the discharge tubes 11 to 14, the pattern of increasing the power output command value S is not limited to the one which is explained above. The power output command value S is one which has correlation with the discharge tube voltage V (FIG. 7). Increasing the power output command value S sometimes includes the sense of increasing the output from the power supply part 2.

The memory (storage part) of the CNC 3 is stored the ratio of change dV/ds of the discharge tube voltage V relative to the power output command value S (reference value dVa/ds) when discharge in the discharge tubes 11 to 14 are normally carried out. Further, the CNC 3 judged that discharge had started when the difference α between the ratio of change dV/ds of the discharge tube voltage V detected by the voltage detecting parts 281 and 282 relative to the power output command value S and the ratio of change dV/ds of the discharge tube voltage V stored in the storage part becomes within a predetermined value α1. However, so long as using the detected values of the voltage detecting parts 281 and 282 as the basis to judge the start of discharge, the CNC 3 (retry processing unit 31) as a discharge start judgment part may be configured in any way. In the above second embodiment, the repeat processing unit 33 as a discharge start judgment part judged that discharge has started when the discharge start condition is established a predetermined number of times N. However, it is also possible to set the number of discharge tubes 11 to 14 as the predetermined number of times N and carry out the repeat processing for the number of discharge tubes 11 to 14. Due to this, the processing of step S5 of FIG. 5 becomes unnecessary.

So long as if, when gradually increasing the power output command value S, the DC current (output current) "A" detected by the current detecting parts 271 and 272 becomes a predetermined value A2 or more, decreasing the power output command value S once, then again gradually increasing the power output command value S, the retry processing unit 31 is not limited to the configuration explained above. The self protection circuit 29 as a overcurrent limiting part is used to stop the operation of the gas laser oscillator 100 when the DC current "A" detected by the current detecting parts 271 and 272 reaches a predetermined value A1 (second threshold value) larger than the predetermined value A2 (first threshold value). However, so long as stopping the output of a power supply part and decreasing the discharge tube voltage V, the overcurrent limiting part may be configured in any way. Further, A1 and A2 may also be set to the same value and the speed of detection of current at the CNC 3 may be made faster than the speed of detection of current at the overcurrent prevention circuit.

The above embodiments and one or more of the modifications may be freely combined.

According to the present invention, when gradually increasing the power output command value, if the detected value of the output current becomes a predetermined threshold value or more, the power output command value is decreased once, then the power output command value is again gradually increased. Due to this, it is possible to prevent an excessive current from flowing to a laser power supply and even when discharge is hard to start, it is possible to easily make discharge start by the time of supply of voltage to the discharge tube becoming longer.

Above, the present invention was explained with reference to its preferred embodiments, but a person skilled in the art would understand that various modifications and changes may be made without departing from the scope of disclosure of the claims set forth later.

The invention claimed is:
1. A gas laser oscillator, comprising:
a discharge tube through which laser gas circulates;
an output command part outputting a power output command;

a power supply part supplying a discharge tube voltage corresponding to the power output command to the discharge tube so as to start a discharge in the discharge tube;

a voltage detecting part detecting the discharge tube voltage;

a current detecting part detecting an output current of the power supply part;

a command voltage control part gradually increasing a power output command value output from the output command part so as to start the discharge in the discharge tube; and a discharge start judgment part judging if the discharge in the discharge tube has started, based on a detected value of the voltage detecting part when gradually increasing the power output command value, wherein, if the output current detected by the current detecting part becomes a predetermined threshold value or more when gradually increasing the power output command value, the command voltage control part decreases the power output command value once, then again gradually increases the power output command value.

2. The gas laser oscillator according to claim 1,
wherein the threshold value is a first threshold value, and
wherein the gas laser oscillator further comprises an overcurrent limiting part stopping a supply of the discharge tube voltage by the power supply part when the output current detected by the current detecting part reaches a second threshold value larger than the first threshold value.

3. The gas laser oscillator according to claim 1, further comprising a storage part in which a ratio of change of a discharge tube voltage relative to a power output command value when normally discharging in the discharge tube is stored in advance, wherein the discharge start judgment part judges that a discharge start condition has been satisfied when a difference between a ratio of change of a discharge tube voltage detected by the voltage detecting part relative to a power output command value and the ratio of change of the discharge tube voltage relative to the power output command value stored in the storage part becomes within a predetermined threshold value, and judges that discharging has started when this discharge start condition has been satisfied a predetermined number of times or more.

4. The gas laser oscillator according to claim 1,
wherein a plurality of the discharge tubes are provided, and
wherein the command voltage control part gradually increases the power output command value until the discharge start judgment part judges that the discharge has started the number of times corresponding to the number of the discharge tubes.

5. The gas laser oscillator according to claim 1,
wherein a plurality of the power supply parts are provided and a plurality of the discharge tubes are provided corresponding to these power supply parts, wherein the power output command output from the output command part includes a bias command which is a common command for the plurality of power supply parts and offset commands set corresponding to the respective plurality of power supply parts, and wherein the output command part adds the offset commands to the bias command to output power output command corresponding to the respective plurality of power supply parts.

* * * * *